(12) United States Patent
Drobychev et al.

(10) Patent No.: US 8,468,291 B2
(45) Date of Patent: *Jun. 18, 2013

(54) ASYNCHRONOUS DISTRIBUTED OBJECT UPLOADING FOR REPLICATED CONTENT ADDRESSABLE STORAGE CLUSTERS

(75) Inventors: Alexandre Drobychev, San Jose, CA (US); Alexander Kesselman, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/444,247

(22) Filed: Apr. 11, 2012

(65) Prior Publication Data

US 2012/0259948 A1   Oct. 11, 2012

Related U.S. Application Data

(63) Continuation of application No. 12/427,367, filed on Apr. 21, 2009, now Pat. No. 8,171,202.

(51) Int. Cl.
*G06F 13/00* (2006.01)
(52) U.S. Cl.
USPC ............................ 711/100; 711/163; 711/164
(58) Field of Classification Search
USPC .......................... 711/100, 163, 164, 205, 207
See application file for complete search history.

(56) References Cited

U.S. PATENT DOCUMENTS

| | | | |
|---|---|---|---|
| 7,376,681 B1 | 5/2008 | Todd et al. | |
| 7,546,284 B1 | 6/2009 | Martinez et al. | |
| 8,171,202 B2 * | 5/2012 | Drobychev et al. | 711/100 |
| 2005/0246393 A1 | 11/2005 | Coates et al. | |
| 2007/0038681 A1 | 2/2007 | Pierce et al. | |
| 2007/0100834 A1 | 5/2007 | Landry et al. | |
| 2010/0017259 A1 | 1/2010 | Luo | |
| 2010/0268902 A1 | 10/2010 | Drobychev et al. | |

OTHER PUBLICATIONS

Chang, F. et al.: "Bigtable: A Distributed Storage System for Structured Data", OSDI '06: 7th USENIX Symposium on Operating Systems Design and Implementation, pp. 205-217.

(Continued)

*Primary Examiner* — Huan Hoang
(74) *Attorney, Agent, or Firm* — Harrity & Harrity, LLP

(57) ABSTRACT

A method performed by two or more devices of a group of devices in a distributed data replication system may include receiving a group of chunks having a same unique temporary identifier, the group of chunks comprising an object to be uploaded; creating an entry for the object in a replicated index, the entry being keyed by the unique temporary identifier, and the replicated index being replicated at each of the two or more devices; and determining, by an initiating device of the two or more devices, that a union of the group of chunks contains all data of the object. The method may also include calculating a content-based identifier to the object; creating another entry for the object in the replicated index, the other entry being keyed by the content-based identifier; and updating the replicated index to point from the unique temporary identifier to the content-based identifier.

20 Claims, 11 Drawing Sheets

OTHER PUBLICATIONS

Nath, P. et al.: "Evaluating the Usefulness of Content Addressable Storage for High-Performance Data Intensive Applications", HPDC'08, Jun. 23-27, 2008, Boston, MA, 10 pages.

Chun, B. et al.: "Efficient Replica Maintenance for Distributed Storage Systems", Proceedings of the $3^{rd}$ Conference on Networked Systems Design & Implementation—vol. 3, 2006, 14 pages.

Zhan, L. et al.: "Metadata Management for Distributed Multimedia Storage System", 2008 International Symposium on Electronic Commerce and Security, pp. 443-447.

Clevenot-Perronnin et al.: "Multiclass P2P Networks: Static Resource Allocation for Service Differentiation and Bandwidth Diversity", Performance Evaluation, vol. 62, No. 1-4, Oct. 1, 2005, pp. 32-49.

Notification of Transmittal of the International Search Report and the Written Opinion of the International Searching Authority, or the Declaration corresponding to PCT/US2010/031410, mailed Sep. 20, 2010, 14 pages.

* cited by examiner

ASYNCHRONOUS DISTRIBUTED OBJECT UPLOADING FOR REPLICATED CONTENT ADDRESSABLE STORAGE CLUSTERS

RELATED APPLICATION

This application is a continuation of U.S. patent application Ser. No. 12/427,367, filed on Apr. 21, 2009, the disclosure of which is incorporated by reference herein.

BACKGROUND

The enterprise computing landscape has undergone a fundamental shift in storage architectures in that central-service architecture has given way to distributed storage clusters. As businesses seek ways to increase storage efficiency, storage clusters built from commodity computers can deliver high performance, availability and scalability for new data-intensive applications at a fraction of the cost compared to monolithic disk arrays. To unlock the full potential of storage clusters, the data is replicated across multiple geographical locations, thereby increasing availability and reducing network distance from clients.

In such systems, distributed objects and references are dynamically created, cloned and deleted in different clusters (using a multi-master model) and the underlying data replication layer maintains the write-order fidelity ensuring that all clusters will end up with the same view of data.

Some current visualization, multimedia, and other data-intensive applications use very large objects—typically hundreds of gigabytes or even terabytes. Uploading of such objects into a distributed storage system is typically done in the streaming mode by splitting the object into chunks and uploading each chunk individually. This process can impose long delays in the upload time that may be exacerbated by potential client and/or server failures. Consequently, efficient distributed object uploading in the streaming mode that provides consistency guarantees is becoming increasingly important for the storage industry being driven by the needs of large-scale systems that allow clients to connect to any cluster available at a time.

SUMMARY

According to one implementation, a method may be performed by a device of a group of devices in a distributed data replication system. The method may include receiving, at the one or more devices, a request, from a client, to upload an object; sending, by the one or more devices, to the client, a unique temporary identification for the object in response to the request; receiving, at the one or more devices, a group of chunks with the unique temporary identification, where the group of chunks comprises the uploaded object; creating, by the one or more devices, an entry for the object in an index for the distributed data replication system, where the entry is keyed by the unique temporary identification; receiving, at the one or more devices, a request, from the client, to finalize the uploaded object; reconstructing, at the one or more devices, the object from the group of chunks; assigning a content-based identifier to the uploaded object; and creating, by the one or more devices, another entry for the object in the index for the distributed data replication system, where the other entry is keyed by the content-based identifier.

According to another implementation, a device, of a group of devices in a distributed data replication system, may include means for storing an index of objects in the distributed data replication system; means for receiving a chunk at the specified offset within a new object for the distributed data replication system, where each of the group of chunks includes the same temporary identifier; means for writing to the index the temporary identifier for the new object; means for locking the new object so no future modifications of content of the new object content are possible; means for computing a content-based identifier for the new object; and means for updating the index to allow the new object to be accessed by the content-based identifier.

According to yet another implementation, a system may include a memory to store instructions, a data store of objects, and an index of the objects in the data store. The system may also include a processor to execute the instructions in the memory to receive a group of chunks having the same unique temporary identifier, where the group of chunks comprises an object to be uploaded; create an entry for the object in the index, where the entry is keyed by the unique temporary identifier; calculate a content-based identifier for the object; create another entry for the new object in the index, where the other entry is keyed by the permanent content-based identifier; and update the index to point from the unique temporary identifier to the content-based identifier.

According to still another implementation, a method performed by two or more devices may include receiving, at the two or more devices, a group of chunks having a same unique temporary identifier, where the group of chunks comprises an object to be uploaded; creating, at the two or more devices, an entry for the object in a replicated index, where the entry is keyed by the unique temporary identifier, and where the replicated index is replicated at each of the two or more devices; determining, by an initiating device of the two or more devices, that a union of the group of chunks contains all data of the object; calculating, by the initiating device, a content-based identifier to the object; creating, at the two or more devices, another entry for the object in the replicated index, where the other entry is keyed by the content-based identifier; and updating, by the two or more devices, the replicated index to point from the unique temporary identifier to the content-based identifier.

According to a further implementation, a computer-readable memory may include computer-executable instructions. The computer-readable memory may include instructions to receive a chunk of an uploaded object at the specified offset, the uploaded object including a group of chunks having the same unique temporary identifier; instructions to determine if a union of the group of chunks contains all data of the uploaded object; instructions to lock the uploaded object from future modifications to content of the uploaded object; instructions to calculate a content-based identifier for the uploaded object; instructions to create an entry for the uploaded object in a replicated index, where the entry is keyed by the content-based identifier; and instructions to update the replicated index to change references to the unique temporary identifier in the replicated index from the unique temporary identifier to the content-based identifier.

BRIEF DESCRIPTION OF THE DRAWINGS

The accompanying drawings, which are incorporated in and constitute a part of this specification, illustrate one or more embodiments described herein and, together with the description, explain these embodiments. In the drawings.

DETAILED DESCRIPTION

The following detailed description refers to the accompanying drawings. The same reference numbers in different drawings may identify the same or similar elements. Also, the following detailed description does not limit the invention.

Systems and/or methods described herein may provide an asynchronous distributed object uploading algorithm in a streaming mode for replicated storage clusters that provides availability, liveness and consistency guarantees for large immutable objects. An object may be split into chunks that are asynchronously uploaded by the application to the available clusters. Implementations described herein may use the underlying replication layer of a distributed multi-master data replication system to replicate the chunk locations in a content addressable index (also referred to herein as a "global index") between different storage clusters. Once the object is finalized by the application, a unique content handle (e.g., a hash value or digital signature) may be computed based on the chunk content, and the object is inserted into the content addressable index as an immutable object.

A used herein the term "object" may refer to an item or collection of data that can be individually selected or manipulated, such as a multimedia file, a picture, a data file, a grouping of text, etc. As used herein, the term "chunk" may refer to a portion of an object uniquely identified by its offset and size that may be uploaded individually and later grouped with other chunks to reconstruct the object.

Exemplary Network Configuration

Figure 1:
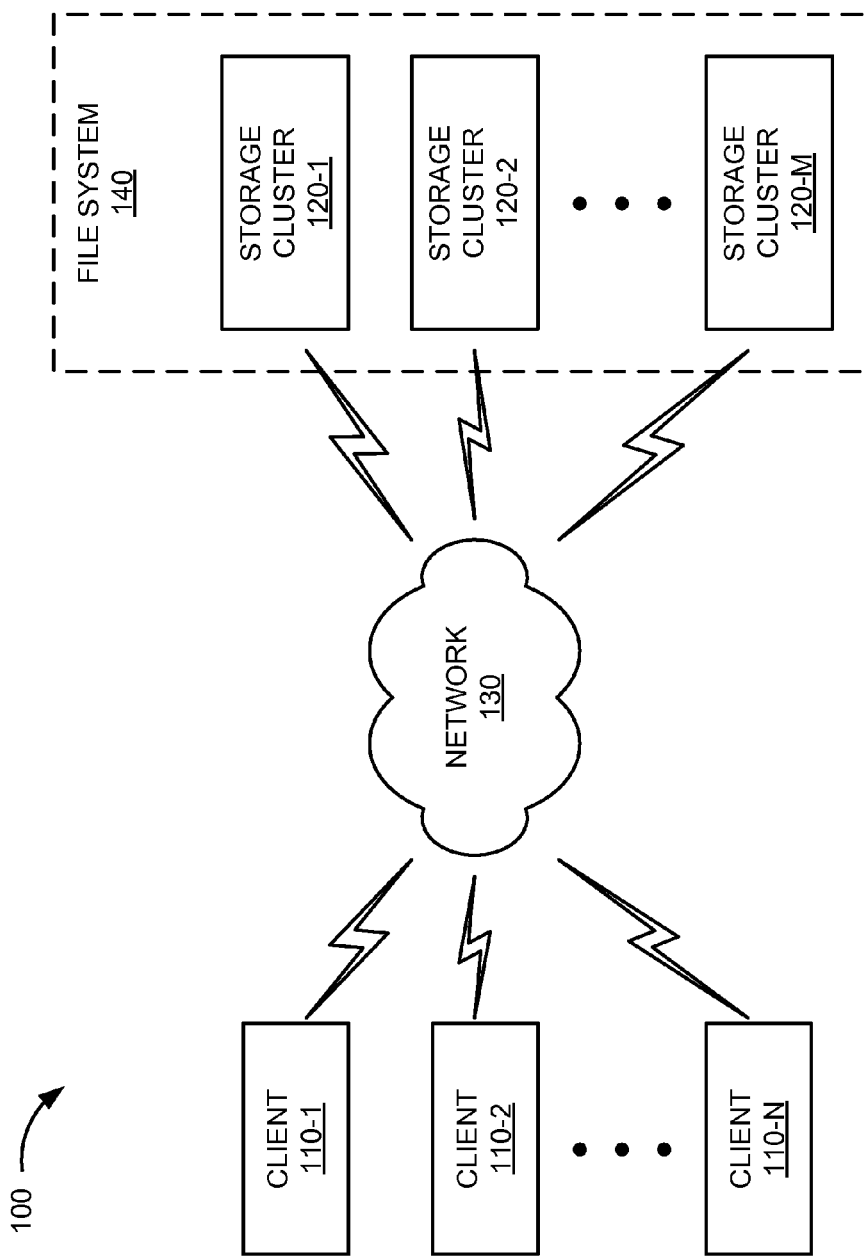
FIG. 1 is a diagram of an exemplary system in which systems and methods described herein may be implemented.

FIG. 1 is a diagram of an exemplary system 100 in which systems and methods described herein may be implemented. System 100 may include clients 110-1 through 110-N (referred to collectively as clients 110, and individually as client 110) and storage clusters 120-1 through 120-M (referred to collectively as storage clusters 120, and individually as storage cluster 120) connected via a network 130. Storage clusters 120 may form a file system 140 (as shown by the dotted line in FIG. 1).

Network 130 may include one or more networks, such as a local area network (LAN), a wide area network (WAN), a telephone network (e.g., the Public Switched Telephone Network (PSTN) or a cellular network), an intranet, the Internet, a similar or dissimilar network, or a combination of networks. Clients 110 and storage clusters 120 may connect to network 130 via wired and/or wireless connections.

Clients 110 may include one or more types of devices, such as a personal computer, a wireless telephone, a personal digital assistant (PDA), a lap top, or another type of communication device, and/or a thread or process running on one of these devices. In one implementation, a client 110 includes, or is linked to, an application on whose behalf client 110 communicates with storage cluster 120 to upload, read or delete file data.

Storage cluster 120 may include one or more server devices, or other types of computation or communication devices, that may store, process, search, and/or provide information in a manner described herein. In one implementation, storage cluster 120 may include one or more servers (e.g., computer systems and/or applications) capable of maintaining a large-scale, random read/write-access data store for files. The data store of storage cluster 120 may permit an indexing system to quickly update portions of an index if a change occurs. The data store of storage cluster 120 may include one or more tables (e.g., a document table that may include one row per uniform resource locator (URL), auxiliary tables keyed by values other than URLs, etc.). In one example, storage cluster 120 may be included in a distributed storage system (e.g., a "Bigtable" as set forth in Chang et al., "Bigtable: A Distributed Storage System for Structured Data," *Proc. of the 7th OSDI*, pp. 205-218 (November 2006)) for managing structured data (e.g., a random-access storage cluster of documents) that may be designed to scale to a very large size (e.g., petabytes of data across thousands of servers).

Although not shown in FIG. 1, system 100 may include a variety of other components, such as one or more dedicated consumer servers or hubs. A consumer server, for example, may store a read-only copy of a data store from one or more storage clusters 120 for access by clients 110. A hub, for example, may store a read-only copy of a data store from one or more storage clusters 120 for distribution to one or more consumer servers.

Exemplary Storage Cluster Configuration

Figure 2:
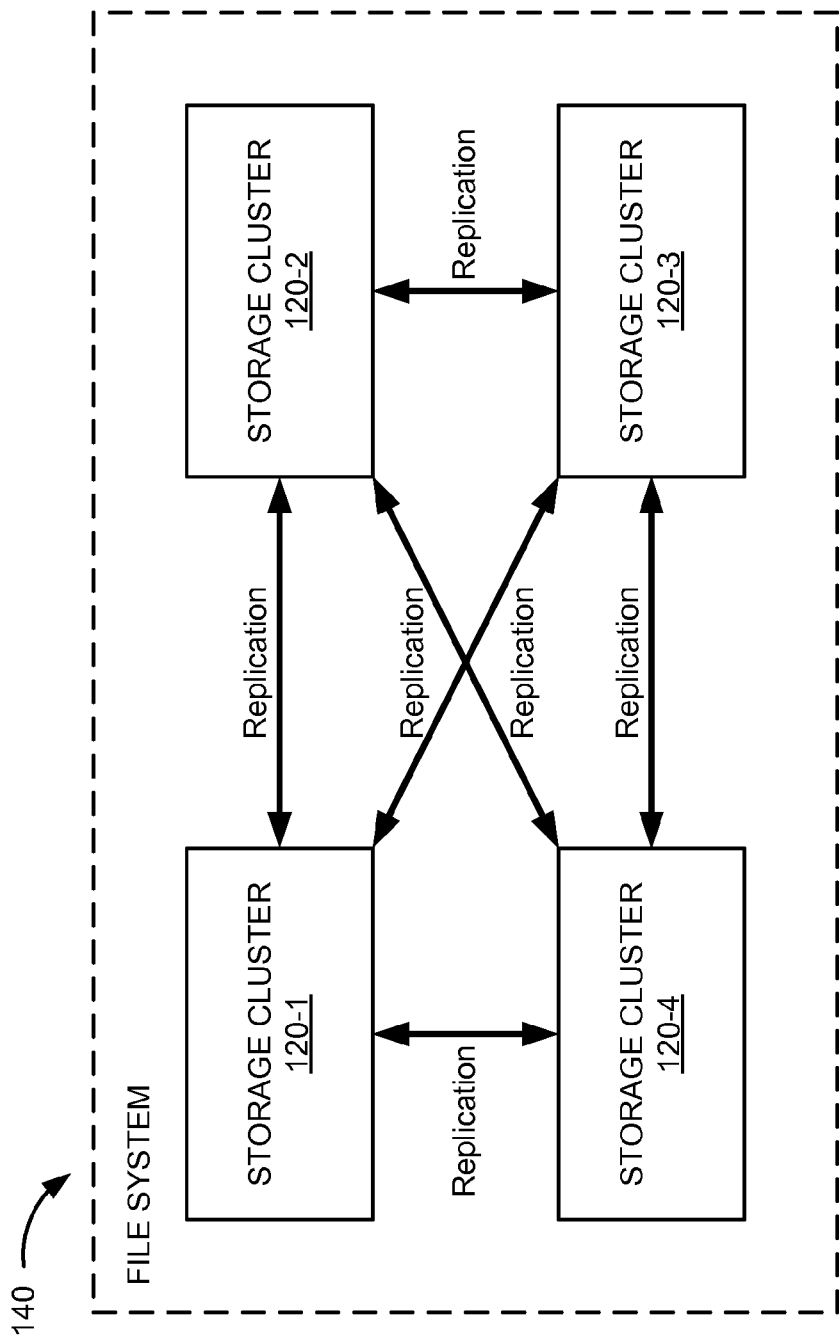
FIG. 2 is a diagram of an exemplary configuration of the file system of FIG. 1.

FIG. 2 is a diagram of an exemplary configuration of the file system 140. As shown in FIG. 2, file system 140 may include storage clusters 120-1, 120-2, 120-3, and 120-4. In one implementation, file system 140 may be a distributed multi-master data replication system, where each of storage clusters 120-1, 120-2, 120-3, and 120-4 may act as a master server for the other storage clusters. In file system 140, data may be replicated across storage clusters 120-1, 120-2, 120-3, and 120-4 (e.g., in multiple geographical locations) to increase data availability and reduce network distance from clients (e.g., clients 110). Generally, distributed objects and references may be dynamically created, cloned and/or deleted in different storage clusters 120 and an underlying data replication layer (not shown) maintains the write-order fidelity to ensure that all storage clusters 120 will end up with the same version of data. Thus, the data replication layer respects the order of writes to the same replica for a single object.

A global index of all of the objects in the distributed multi-master data replication system may be associated with each storage cluster 120. Each stored object may be listed by a unique content handle (such as a hash value, digital signature, etc.) in the global index. In implementations described herein, new objects that are being uploaded from a client may be assigned a unique temporary identification (ID) in the global index that is associated with each chunk of the new object. When all chunks of an upload object have been received, one of the storage clusters may assign a permanent content handle to the uploaded object and update the global index to allow the object to be accessed using the permanent content handle. Changes to the global index made by one storage cluster may be replicated to other storage clusters.

Although FIG. 2 shows exemplary functional components of file system 140, in other implementations, file system 140 may contain fewer, additional, different, or differently arranged components than depicted in FIG. 2. In still other implementations, one or more components of file system 140 may perform one or more tasks described as being performed by one or more other components of file system 140.

Figure 3:
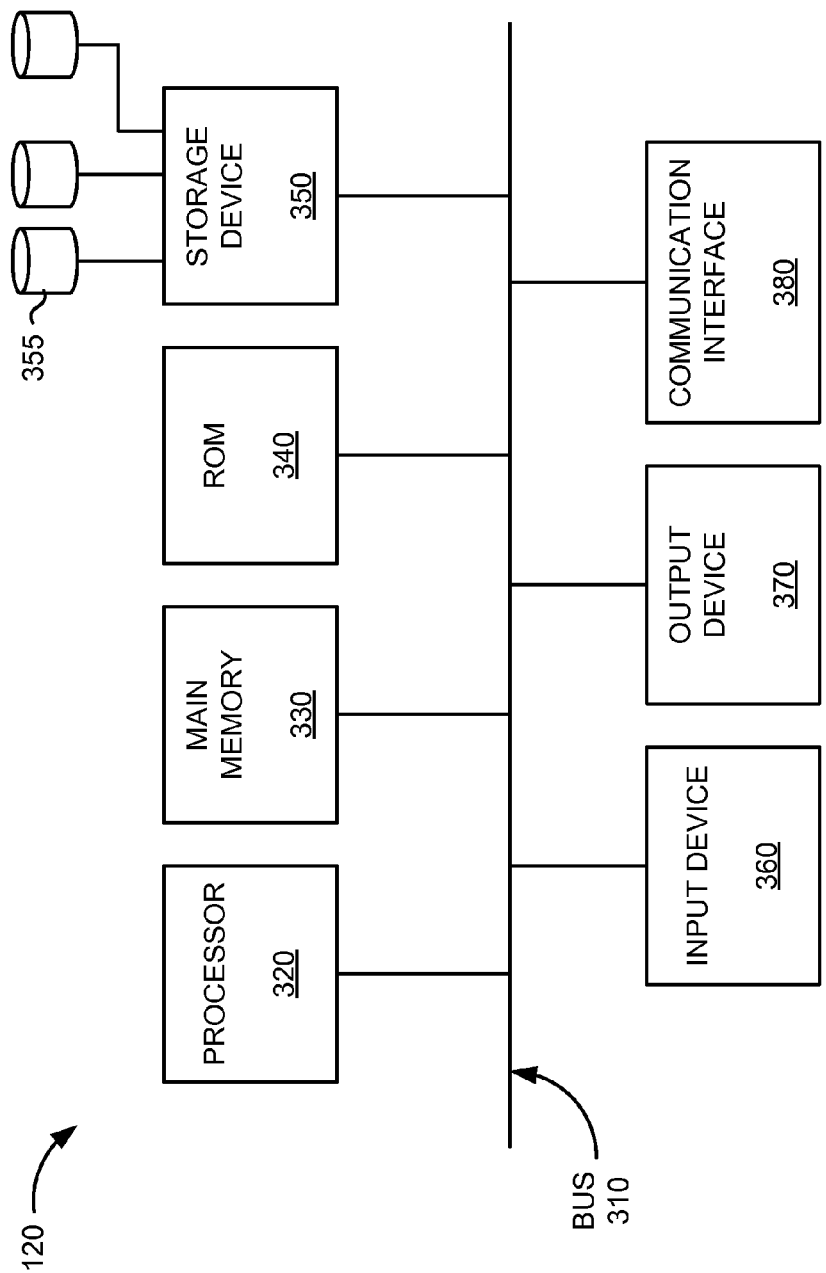
FIG. 3 is a diagram of exemplary components of a storage cluster of FIG. 1.

FIG. 3 is a diagram of exemplary components of storage cluster 120. Storage cluster 120 may include a bus 310, a processor 320, a main memory 330, a read-only memory (ROM) 340, a storage device 350, an input device 360, an output device 370, and a communication interface 380. Bus 310 may include one or more conductors that permit communication among the components of storage cluster 120.

Processor 320 may include any type of processor or microprocessor that may interpret and execute instructions. Main memory 330 may include a random access memory (RAM) or another type of dynamic storage device that may store information and instructions for execution by processor 320. ROM 340 may include a ROM device or another type of static storage device that may store static information and instructions for use by processor 320. Storage device 350 may include a magnetic and/or optical recording medium and its corresponding drive. For example, storage device 350 may include one or more local disks 355 that provide persistent storage. In one implementation, storage cluster 120 may maintain metadata, for objects stored in file system 140, within one or more computer-readable memories, such as main memory 330 and/or storage device 350. For example, storage cluster 120 may store a global index within storage device 350 for all the objects stored within a distributed multi-master data replication system.

Input device 360 may include one or more mechanisms that permit an operator to input information to storage cluster 120, such as a keyboard, a keypad, a button, a mouse, a pen, etc. Output device 370 may include one or more mechanisms that output information to the operator, including a display, a light emitting diode (LED), etc. Communication interface 380 may include any transceiver-like mechanism that enables storage cluster 120 to communicate with other devices and/or systems. For example, communication interface 380 may include mechanisms for communicating with other storage clusters 120 and/or clients 110.

Figure 4:
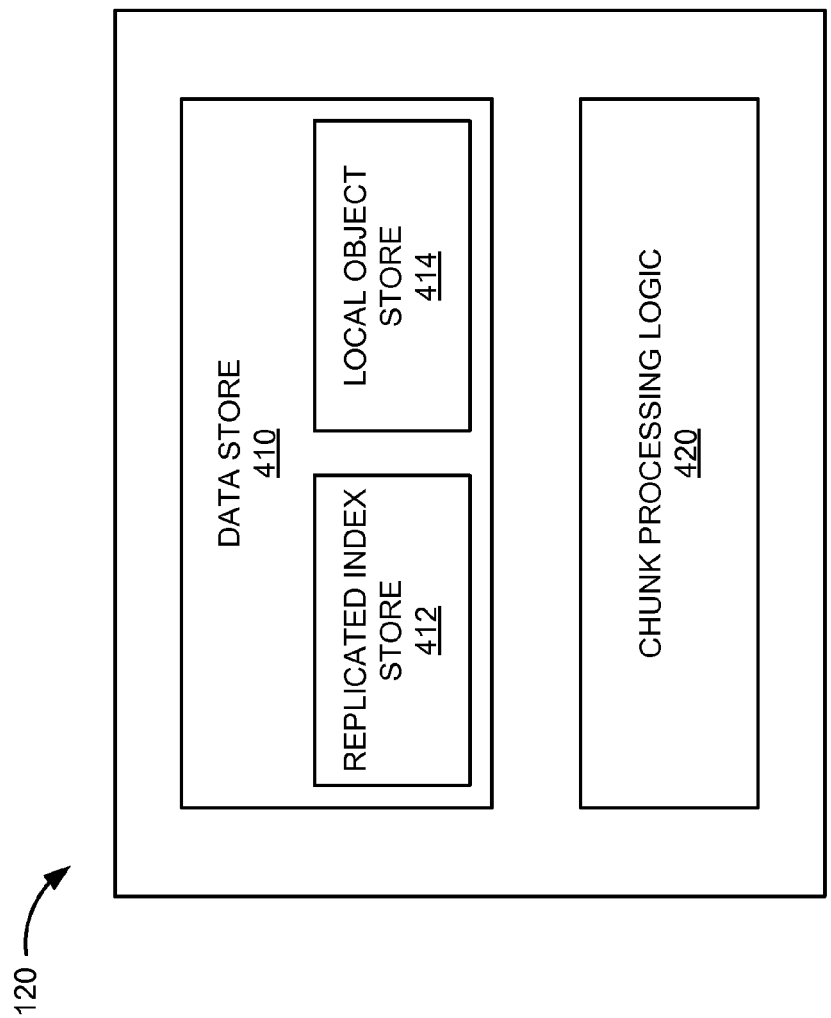
FIG. 4 is a functional block diagram of an exemplary storage cluster of FIG. 1.

FIG. 4 illustrates a functional block diagram of storage cluster 120. As shown in FIG. 4, storage cluster 120 may include data store 410 and chunk processing logic 420. In one implementation, as illustrated in FIG. 4, data store 410 may be provided within storage cluster 120. In other implementations, some or all of data store 410 may be stored within one or more other devices of system 100 in communication with storage cluster 120, such as external memory devices or devices associated with an indexing system (not shown).

Data store 410 may include a replicated index store 412 and a local object store 414. Replicated index store 412 may be included as part of the replication layer of the distributed multi-master data replication system. Replicated index store 412 may store information associated with the global index. At least a portion of replicated index store 412 may be replicated on multiple storage clusters 120. The number of replicas for each replicated index store 412 may be user-configurable. Local object store 414 may store objects locally within storage cluster 120. Local object store 414 may include files, such as images or videos uploaded by clients (e.g., clients 110).

Chunk processing logic 420 may include logic to receive uploaded chunks from a client, where each chunk is identified by its offset within the object, and/or to automatically reconstruct objects out of multiple chunks within the distributed multi-master data replication system (e.g., storage clusters 120-1, 120-2, 120-3, and 120-4). When a client (e.g., client 110) begins uploading an object, chunk processing logic 420 may assign a unique temporary identifier for the object that the client can use for uploading all chunks of the object. When the client (e.g., client 110) completes uploading all chunks of the object, the client may call a finalize function to be performed by chunk processing logic 420 at one of the clusters 120. Chunk processing logic 420 may make changes in the global index to lock (or seal) the object (e.g., ensure that no future modifications of the object content are possible). Chunk processing logic 420 may also compute the object content hash (e.g., an alphanumeric string generated based on the object's contents) and assign a permanent identifier to the object based on the hash. Chunk processing logic 420 may further update the global index to allow the object to be accessed in the distributed multi-master data replication system using the permanent identifier.

To facilitate finalization of an object from multiple uploaded chunks, records (e.g., metadata) may be generated by chunk processing logic 420 and appended to a portion of the global index associated with a particular content handle or temporary ID. Records generated by one cluster can eventually propagate to the index replicas at the other clusters in a distributed multi-master data replication system. Records may include, for example, a "FinStarted" designator for indicating that the object finalization has started, a "FinSealed" designator for indicating that all metadata of the uploaded object chunks has been replicated by the index and no further changes to an object's content may be made, a "FinRefCopy" designator to indicate a cross-reference to a permanent ID should be included in the global index replica and the object references should be copied from the temporary ID to the permanent ID index entry, a "FinRefCopyDone" designator for indicating a cross-reference has been added to the global index replica and all object references have been copied from the temporary ID to the permanent ID index entry, and "FinDone" designator to redirect future references from the temporary ID to the permanent ID index entry. Record formats and uses are described in more detail below.

Although FIG. 4 shows exemplary functional components of storage cluster 120, in other implementations, storage cluster 120 may contain fewer, additional, different, or differently arranged functional components than depicted in FIG. 4. In still other implementations, one or more functional components of storage cluster 120 may perform one or more other tasks described as being performed by one or more other functional components.

Exemplary Record Structure

Figure 5:
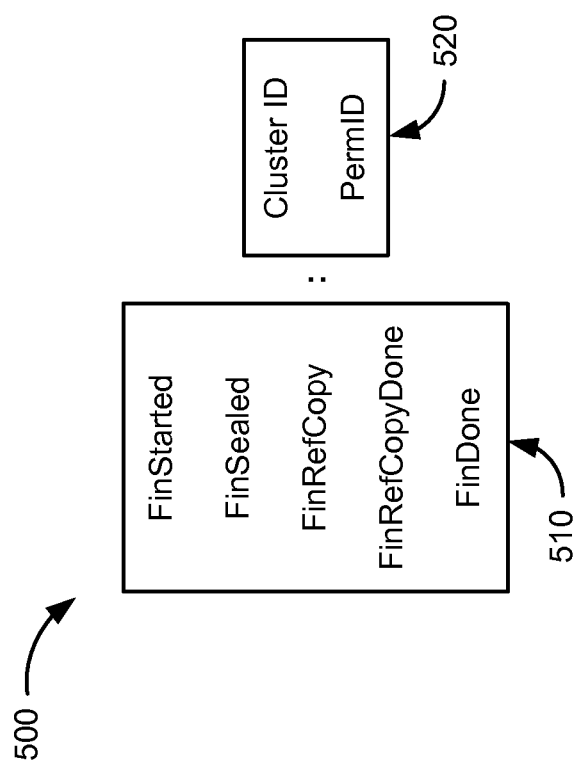
FIG. 5 is a diagram of an exemplary finalization record structure that may be used within an index of a distributed multi-master data replication system.

FIG. 5 provides an illustration of an exemplary record structure 500 for a finalization record that may be written to the global index in an exemplary implementation. The finalization record may be associated in the global index with a particular temporary ID of an object replica.

As shown in FIG. 5, record structure 500 may include a designation section 510 and a location section 520. Designation section 510 may include, for example, a "FinStarted" designator, a "FinSealed" designator, a "FinRefCopy" designator, a "FinRefCopyDone" designator, or a "FinDone" designator. The storage cluster 120 that receives a finalize request (referred to herein as the "initiating cluster") from the client (e.g., client 110) at the completion of an upload may add a "FinStarted" record to the object's metadata keyed by a temporary ID.

The "FinSealed" designator may be added by each storage cluster (including the initiating cluster) that encounters a "FinStarted" record. The "FinSealed" designator may be used to indicate that no further changes (e.g., additions, updates, or deletions) may be made to the object replica associated with the "FinSealed" record.

The "FinRefCopy" designator may be used by the initiating cluster to indicate a cross-reference from the temporary ID to a permanent ID (e.g., based on content hash for the object). The initiating cluster may write a "FinRefCopy" message to the object's metadata in the global index. The "FinRefCopy" designator may be replicated with the global index to indicate to other storage clusters 120 that a permanent ID is available for the object and that references associated with the temporary ID should be copied to the permanent ID index entry. The "FinRefCopy" designator may also indicate that no new references can be added to the temporary ID index entry.

The "FinRefCopyDone" designator may be used to indicate that a cluster has copied any references associated with the temporary ID to the permanent ID entry in the global index replica. When the initiating cluster sees a "FinRefCopyDone" designator for all storage clusters in the distributed multi-master data replication system, the "FinStarted," "FinSealed," and "FinRefCopyDone" records associated with the temporary ID may be deleted. In one implementation, the "FinRefCopy" designator may be left in the global index to provide a cross-reference to direct future references for the temporary ID to the permanent ID. In another implementation, the "FinRefCopy" designator may be deleted with the other records and a new "FinDone" record added.

The "FinDone" designator may be used by the initiating cluster to provide permanent cross-reference from the entry keyed by the temporary ID to a permanent ID (e.g., based on content hash for the object) for the corresponding object replica. The initiating cluster may write a "FinDone" message to the object's metadata in the global index. The "FinDone" designator may be replicated with the global index to indicate to other storage clusters 120 that a permanent ID is available for the object and that references associated with the temporary ID should be changed to the permanent ID index entry.

In one implementation, when the designation section 510 includes "FinStarted," "FinSealed," or "FinRefCopyDone" designations, location section 520 may include a unique identification (e.g., "Cluster ID") for the storage cluster 120 that is associated with the designation in designation section 510. In another implementation, when designation section 510 includes a "FinRefCopy" or "FinDone" designation, location section 520 may include a cross-reference to a permanent ID associated with temporary ID of the object replica.

Record structure 500 may be listed in the form of "Designation: Location." For example, a record for a particular object with a temporary ID may be added to the global index by storage cluster 120-1 with the record "FinStarted: 01," where "FinStarted" is the designator and where "01" is the cluster ID for storage cluster 120-1. A record for another replica of the same object in storage cluster 120-2 may be "FinRefCopy: cat1324," where "FinRefCopy" is the designator and where "cat1324" is the permanent ID for the object.

Exemplary Process Flows

Figure 6:
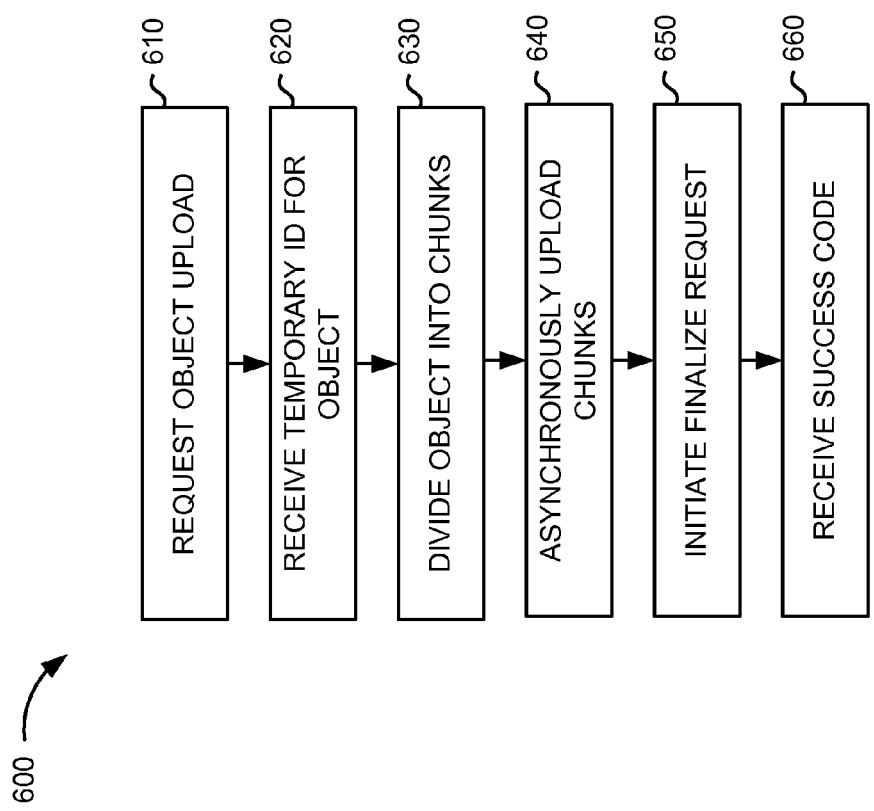
FIG. 6 is a flowchart of an exemplary process for managing client-initiated upload operations according to an implementation described herein.

FIG. 6 provides a flowchart of an exemplary process 600 for managing client-initiated upload operations according to an implementation described herein. In one implementation, process 600 may be performed by one of clients 110. In another implementation, some or all of process 600 may be performed by another device or group of devices, including or excluding client 110.

Referring to FIG. 6, process 600 may begin by requesting to upload an object (block 610) and receiving a temporary ID for the object (block 620). For example, client 110 may submit a request to storage cluster 120 to upload a file to a distributed multi-master data replication system. The storage cluster may receive the request and assign a unique temporary ID for the file. The temporary ID may be provided in any format that is distinguishable from the format of a permanent ID (e.g., a content-based hash) used in the global index. Client 110 may receive the temporary ID from storage cluster 120.

The object may be divided into chunks (block 630). For example, client 110 may split the file into multiple chunks that have no overlapping data. In one implementation, each chunk may have a corresponding byte range identified by its offset and data size (e.g., a first chunk may indicate a starting offset of 0 and a chunk size of 63,900,000 bytes; a second chuck may indicate an offset of 63,900,000 and a chunk size of 63,989,050 bytes; a third chunk may indicate an offset of 127,889,049 and a chunk size of 62,800,000 bytes; etc.).

The chunks may be asynchronously uploaded (block 640) and a finalize request may be initiated (block 650). For example, client 110 may upload the chunks to any available storage cluster(s) 120 in the distributed multi-master data replication system. The chunks may be uploaded so that each chunk is labeled with the same assigned temporary ID and so the union of the byte ranges of the uploaded chunks covers the entire file. When the last chunk is uploaded, client 110 may call a finalize function to initiate activity within the distributed multi-master data replication system to lock the file, compute the file's content hash and assign a permanent ID based on the hash. The finalize request may be received by any storage cluster 120 that has a metadata replica of the uploaded object. The storage cluster 120 that receives the finalize request may act as the initiating cluster with respect to the particular uploaded file for subsequent finalization activities within the distributed multi-master data replication system.

A success code may be received (block 660). For example, client 110 may receive a success code from one of the storage clusters 120 (e.g., from the initiating cluster) to indicate the file has been successfully uploaded to the distributed multi-master data replication system.

Figure 7:
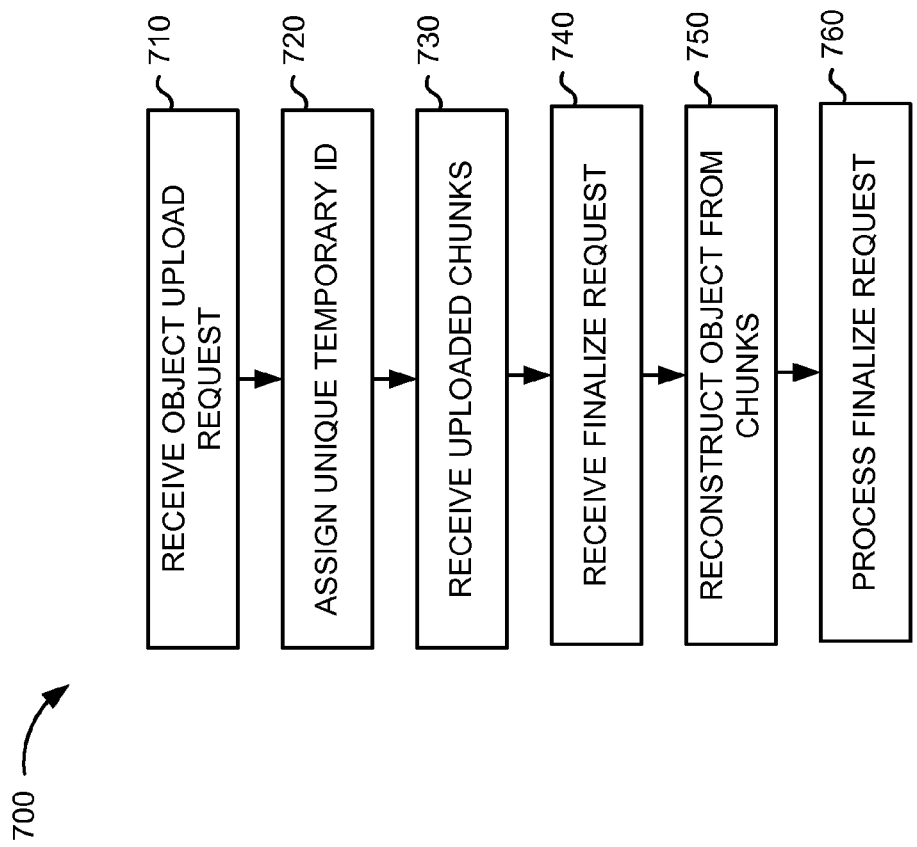
FIG. 7 is a flowchart of an exemplary process for receiving client-initiated uploads in a distributed multi-master data replication system.

FIG. 7 is a flowchart of an exemplary process 700 for receiving client-initiated uploads in a distributed multi-master data replication system (e.g., file system 140). In one implementation, process 700 may be performed by one or more of storage clusters 120. In another implementation, some or all of process 700 may be performed by another device or a group of devices, including or excluding storage clusters 120. Process 700 may be implemented periodically in each storage cluster 120 and may include a scan of all, or a portion, of the objects in the storage cluster 120. For particular examples of process 700 described below, reference may be made to storage clusters 120-1 and 120-2 of file system 140, where storage cluster 120-1 includes a cluster ID of "01" and storage cluster 120-2 includes a cluster ID of "02."

As illustrated in FIG. 7, process 700 may begin by receiving an object upload request (block 710) and assigning a unique temporary ID for the object. For example, storage cluster 120-1 may receive an upload request for an object from one of clients 110. Storage cluster 120 may assign a unique temporary ID for the object that client 110 may use to designate each chunk of the object during uploading. The temporary ID may be used as a key in the global index for the uploaded object. The temporary ID may be provided in any format that is distinguishable from the format of a permanent ID (e.g., a content-based hash) used in the global index.

The uploaded chunks may be received (block 730). For example, one or more storage clusters 120 may receive chunks from client 110. Chunks may be uploaded to any available cluster(s) 120 in the distributed multi-master data replication system, such that different chunks of the same object may be received at different storages clusters 120. The chunks may be uploaded so that each chunk is labeled with the same assigned temporary ID and so the union of the byte ranges of the uploaded chunks covers the entire object.

A finalize request may be received (block 740). For example, one of storage clusters 120 may receive a finalize request from the client 110 that uploaded the object chunks. The finalize request may be received after all chunks of the object have been uploaded. The storage cluster 120 receiving the finalize request may be referred to as the initiating cluster.

The object may be reconstructed from the uploaded chunks (block 750). For example, one of the storage clusters 120 (e.g., the initiating cluster) may receive, through the underlying replication layer of the distributed multi-master data replication system, the locations of all chunks associated with an uploaded object. Using the unique temporary ID and the byte range sequence for each chunk, the storage cluster 120 may copy the chunks from their current locations and assemble them to reconstruct the uploaded object.

The finalize request may be processed (block 760). For example, the initiating cluster may initiate a series of asynchronous activities to lock the object (e.g., ensure that no future modifications of the object content are possible), compute the object content hash (e.g., an alphanumeric string generated based on the object contents), and assign a permanent ID to the object based on the hash. The finalization activities may also update the global index to allow the object to be accessed in the distributed multi-master data replication system using both the permanent ID and the temporary ID. Processing of the finalize request is discussed further with respect to FIGS. 8-10.

Figure 8:
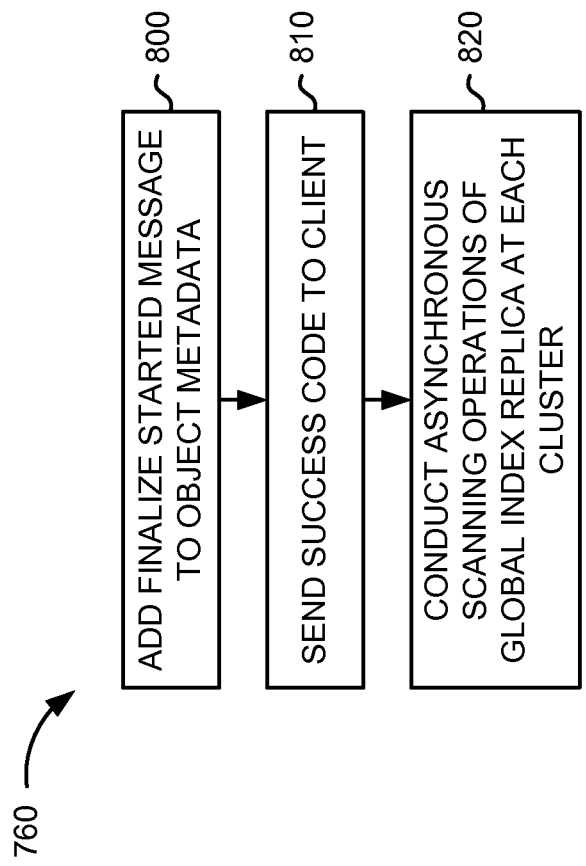
FIG. 8 is a flowchart of an exemplary process for processing a finalize request for an uploaded object.

FIG. 8 is a flowchart of an exemplary process for processing a finalize request for an uploaded object in block 760 above. In one implementation, the process may be performed by an initiating cluster (e.g., one of storage clusters 120). In another implementation, some or all of the process may be performed by another device or a group of devices, including or excluding the initiating cluster. For particular examples of process in FIG. 8, reference may be made to a distributed multi-master data replication system (e.g., file system 140) that includes three storage clusters, storage clusters 120-1, 120-2, and 120-3. Assume storage cluster 120-1 is the initiating cluster with a cluster ID of "01." Storage clusters 120-2 and 120-3 are separate storage clusters with cluster IDs of "02" and "03," respectively.

A finalize started message may be added to the object metadata (block 800). For example, initiating cluster 120-1 (e.g., chunk processing logic 420) may add "FinStarted:01" to the object metadata in the global index replica stored in initiating cluster 120-1. As with any update to the global index, the finalization started message may eventually be propagated to all global index replicas at other storage clusters (e.g., including storage cluster 120-2 and 120-3) in the distributed multi-master data replication system.

A success code may be sent to the client (block 810). For example, initiating cluster 120-1 may send a success code to client 110 that initiated the object upload. The success code may indicate that all chunks of the object have been successfully uploaded and that the upload process is complete from the perspective of client 110.

Asynchronous scanning operations of the global index replica may be conducted at each cluster (block 820). For example, any of storage clusters 120-1, 120-2, and 120-3 may periodically conduct a scan of and/or write to all or a portion of their respective global index replicas. Scanning operations are discussed further with respect to FIG. 9.

Figure 9:
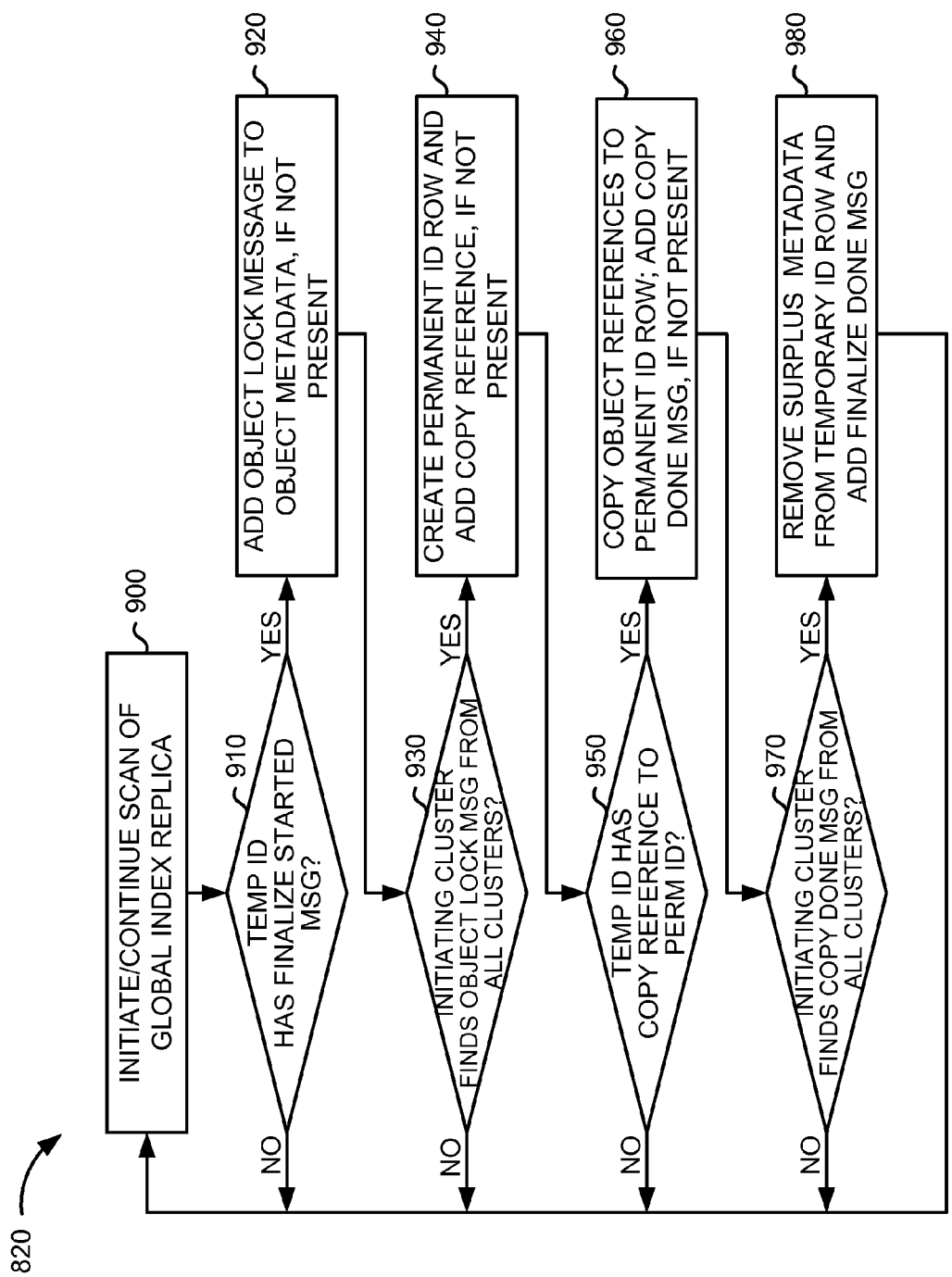
FIG. 9 is a flowchart of an exemplary process for conducting scanning operations at a storage cluster according to an implementation described herein.

FIG. 9 is a flowchart of an exemplary process for conducting scanning operations at a storage cluster according to an implementation described herein. In one implementation, the process may be performed by one of storage clusters 120 (e.g., storage cluster 120-1, 120-2, or 120-3). Each storage cluster 120, within a distributed multi-master data replication system, may perform the process asynchronously until finalization of an uploaded object is complete. For particular examples of process in FIG. 9, reference may be made to a distributed multi-master data replication system (e.g., file system 140) that includes three storage clusters, storage clusters 120-1, 120-2, and 120-3. Assume storage cluster 120-1 is the initiating cluster with a cluster ID of "01." Storage clusters 120-2 and 120-3 are separate storage clusters with cluster IDs of "02" and "03," respectively.

A scan of the global index replica may be initiated (block 900). For example, storage cluster 120-2 may perform an off-line scan of the global index replica stored within storage cluster 120-2. The scan may review all index entries in storage cluster 120-2.

It may be determined if an entry keyed by a temporary ID has a finalize started message (block 910). For example, storage cluster 120-2 may encounter an object in the global index replica that is keyed by a temporary ID and includes a finalize started message (e.g., "FinStarted:01") from another storage cluster (e.g., from storage cluster 120-1). If the entry keyed by a temporary ID does not have a finalize started message (block 910—NO), the process may return to block 900 to continue the scan or eventually initiate another scan of the global index replica.

If the entry keyed by a temporary ID has a finalize started message (block 910—YES), an object lock message may be added to the object message data, if an object lock message is not already present for the storage cluster conducting the scan (block 920). For example, when the scan in storage cluster 120-2 sees "FinStarted:01" in an entry keyed by a temporary ID, the storage cluster 120 may add "FinSealed:02" to the object's metadata in the global index replica in storage cluster 120-2. The presence of the "FinSealed" message prohibits other system components of the corresponding storage cluster from making any changes (additions, updates, deletions) to the uploaded object bytes.

It may be determined if an entry keyed by a temporary ID has an object lock message from all storage clusters in the distributed multi-master data replication system (block 930). For example, initiating cluster 120-1 may encounter an object in the global index replica that is keyed by a temporary ID and includes object lock messages (e.g., "FinSealed:01," "FinSealed:02," "FinSealed:03") from all storage clusters in the distributed multi-master data replication system (e.g., from storage clusters 120-1, 120-2 and 120-3). If the entry keyed by a temporary ID does not have an object lock message from all storage clusters (block 930—NO), the process may return to block 900 to continue the scan or eventually initiate another scan of the global index replica.

If the entry keyed by a temporary ID has an object lock message from all storage clusters (block 930—YES), a permanent ID entry and a copy reference to the permanent ID may be added, if not already present (block 940). For example, if the scan in initiating cluster 120-1 sees object lock messages for all storage clusters (e.g., "FinSealed:01," "FinSealed:02," "FinSealed:03") in an entry keyed by a temporary ID, storage cluster 120-1 (e.g., chunk processing logic 420) may compute the content hash for the object and create the permanent object ID based on the content hash. Storage cluster 120-1 may then add "FinRefCopy:PermID" to the object's metadata in storage cluster 120-1 (where PermID is the newly generated permanent ID based on the content hash). Presence of the "FinRefCopy:PermID" message may also prohibit other system component from making any changes (e.g., additions, updates, deletions) to the object's bytes, as well as to the references stored with the object's metadata, in the other storage clusters (e.g., storage clusters 120-2 and 120-3).

It may be determined if an entry keyed by a temporary ID has a copy reference to a permanent ID (block 950). For example, any storage cluster 120 (e.g., any of storage clusters 120-1, 120-2, or 120-3) may encounter an object in the global index replica that is keyed by a temporary ID and includes a copy reference message (e.g., "FinRefCopy:PermID"). If the entry keyed by a temporary ID does not have a copy reference to a permanent ID (block 950—NO), the process may return to block 900 to continue the scan or eventually initiate another scan of the global index replica.

If the entry keyed by a temporary ID has a copy reference to a permanent ID (block 950—YES), object references in the temporary ID entry may be copied to the permanent ID entry, and a copy done message may be added, if not already present (block 960). For example, if the scan in storage cluster 120-2 sees "FinRefCopy:PermID" in an entry keyed by a temporary ID, storage cluster 120-2 may copy all object references listed in the temporary ID entry to the entry keyed by the corresponding permanent ID. Once copying is complete, storage cluster 120-2 may add "FinRefCopyDone:02" to the entry keyed by the temporary ID in storage cluster 120-2.

It may be determined if an entry keyed by a temporary ID has copy done messages from all clusters (block 970). For example, initiating cluster 120-1 may encounter an object in the global index replica that is keyed by a temporary ID and includes copy done messages (e.g., "FinRefCopyDone:01," "FinRefCopyDone:02," "FinRefCopyDone:03") from all storage clusters in the distributed multi-master data replication system (e.g., from storage clusters 120-1, 120-2 and 120-3). If the entry keyed by a temporary ID does not have a copy done message (block 970—NO), the process may return to block 900 to continue the scan or eventually initiate another scan of the global index replica.

If the entry keyed by a temporary ID has a copy done message (block 970—YES), then surplus metadata associated with the temporary ID may be removed and a finalize done message may be added (block 980). For example, if the scan in the initiating cluster 120-1 sees "FinRefCopyDone" for all storage clusters (e.g., "FinRefCopyDone:01," "FinRefCopyDone:02," "FinRefCopyDone:03") in an entry keyed by a temporary ID, initiating cluster 120-1 may remove all finalize started ("FinStarted"), object lock ("FinSealed"), copy reference ("FinRefCopy") messages, and copy done ("FinRefCopyDone") messages from the entry keyed by the temporary ID. The initiating cluster may also add a "FinDone:PermID" message to provide a permanent cross-reference from the entry keyed by the temporary ID to an entry keyed by the corresponding permanent ID (e.g., based on content hash for the object). Note that the finalization process does not affect the validity of pre-existing object references to the temporary ID. Removal of the surplus metadata may complete the finalization process for an uploaded object. The process may return to block 900 to continue the scan or eventually initiate another scan of the global index replica.

In another implementation, the above process can be optimized if the client (e.g., client 110) pre-computes the permanent object ID prior to starting the upload process. In this variation, the copying of references (e.g., "FinRefCopy" messages) to an entry keyed by a new permanent ID may be eliminated. Instead, the initiating cluster 120 may simply mark the uploaded object as finalized once "FinSealed" messages have be received from all storage clusters 120. Note that the temporary ID in this variation equals the permanent ID.

Figure 10:
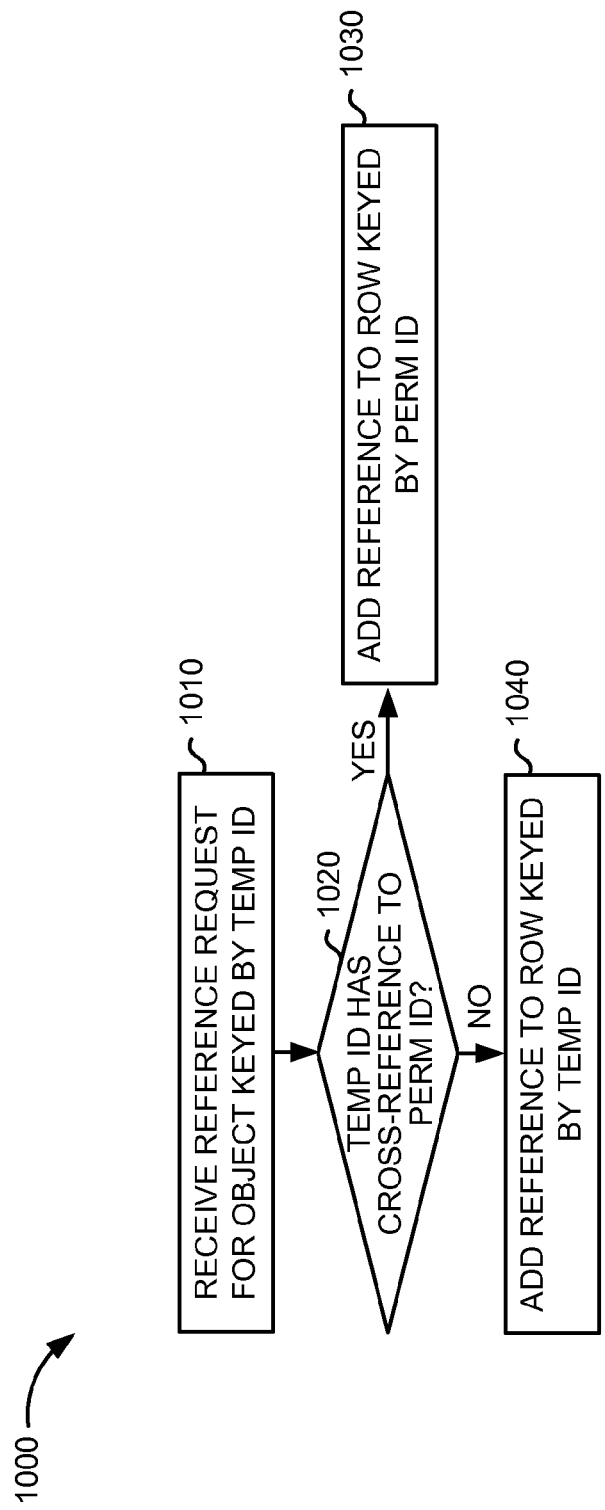
FIG. 10 is a flowchart of an exemplary process for creating new references to a global index of replicated storage clusters.

FIG. 10 provides a flowchart of an exemplary process 1000 for adding new object references to a global index of replicated storage clusters. Generally, any system component in the distributed multi-master data replication system that intends to add a reference to an index entry keyed by a temporary ID, can first check if there is a copy reference message in that entry. If a copy reference message is found, the new reference is instead added to the entry keyed by the corresponding Permanent ID. In one implementation, the process may be performed by one of storage clusters 120 (e.g., storage cluster 120-1, 120-2, or 120-3). Each storage cluster 120, within a distributed multi-master data replication system, may perform the process asynchronously until the new reference has been replicated at each storage cluster 120.

A reference request for an object keyed by a temporary ID may be received (block 1010). For example, storage cluster 120-1 may receive a request to add a new reference to an index entry keyed by a temporary ID, "TempID3" (e.g., a reference based on an object that had been uploaded, but not yet finalized).

It may be determined if the entry keyed by the temporary ID has a cross-reference to a permanent ID (block 1020). For example, storage cluster 120-1 may scan the entry keyed by the "TempID3" to identify any "FinRefCopy" messages or "FinDone" messages in the entry. If the entry keyed by the temporary ID has a cross-reference to a permanent ID (block 1020—YES), the reference may be added to the entry keyed by the permanent ID (block 1030). For example, storage cluster 120-1 may identify a "FinRefCopy:PermID4" message and add the new reference to the entry keyed by "PermID4." If the entry keyed by the temporary ID does not have a cross-reference to a permanent ID (block 1020—NO), the reference may be added to the entry keyed by the temporary ID (block 1040). For example, if no "FinRefCopy" message or "FinDone" message is found, storage cluster 120-1 may add the new reference to the entry keyed by "TempID3."

EXAMPLE

Figure 11:
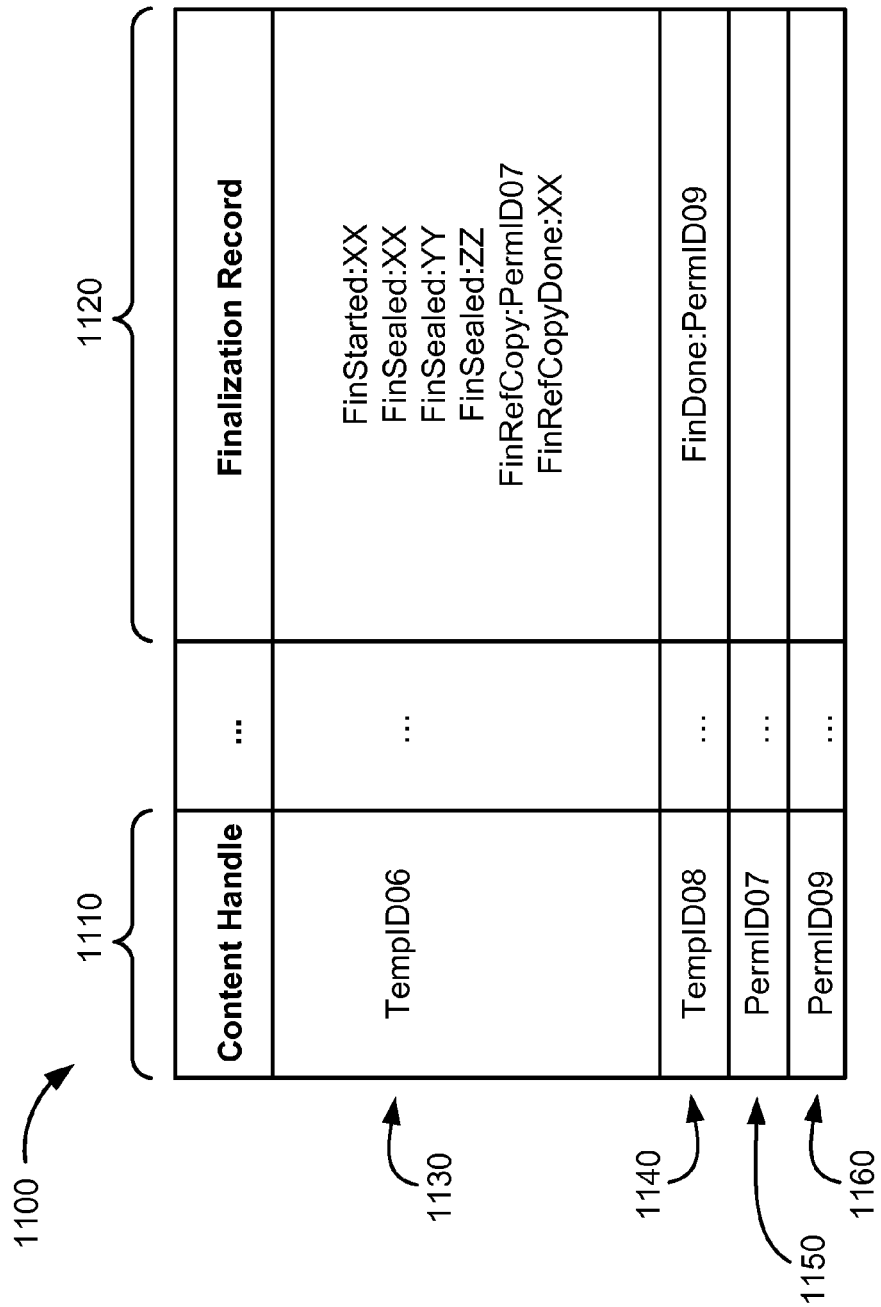
FIG. 11 is a diagram illustrating a portion of an exemplary global index according to an implementation described herein.

FIG. 11 provides a portion 1100 of an exemplary global index replica according to an implementation described herein. The index may include a content handle column 1110 and a finalization record column 1120. Other information, such as object references and chunks metadata (not shown), may also be included in the global index replica. Content handle column 1110 and finalization record column 1120 are shown in portion 1100 for clarity. In other implementations, finalization records in the global index replica may be intermixed with other records and delineated by separators (e.g., commas, spaces, etc.) with or without the use of columns. Other data structures may also be used for the global index replica.

Assume, in exemplary index replica portion 1100, a distributed multi-master data replication system includes three storage clusters, XX, YY, and ZZ. A finalization algorithm may run periodically in each of storage clusters XX, YY, and ZZ and may scan all or a portion of the global index. Also, messages (e.g., FinStarted, FinSealed, FinRefCopy, and FinRefCopyDone) may be written by one of storage clusters XX, YY, or ZZ to the global index replica associated with a particular object content handle. Modifications to the global index may be replicated to all other participating clusters (e.g., the remaining of storage clusters XX, YY, and ZZ).

As shown in FIG. 11, index portion 1100 includes content handles and associated finalization records for three objects. A row 1130 keyed by "TempID06" has records indicating a finalize process has been started by the initiating cluster, XX, for the object associated with "TempID06." Row 1130 also includes records indicating the object has been locked at storage cluster XX (i.e., "FinSealed:XX"), at storage cluster YY (i.e., "FinSealed:YY"), and at storage cluster ZZ (i.e., "FinSealed:ZZ"). The initiating cluster XX, having identified "FinSealed" messages for all storage clusters in the distributed multi-master data replication system and confirmed that all bytes of the object corresponding to "TempID06" have been uploaded to to XX, YY and ZZ, has calculated a content hash (i.e., "PermID07") for the object. Storage cluster XX has, thus, added "FinRefCopy:PermID07" to the finalization record in row 1130 and created a new row 1150 keyed by "PermID07" that includes the object references from row 1130. A copy done message (i.e., "FinRefCopyDone:XX") has also been included in row 1130 to indicated storage cluster XX has completed the copying process. Once a "FinRefCopyDone" message is provided from the other storage clusters YY and ZZ (and replicated to initiating cluster XX), the surplus message data (i.e., "FinStarted:XX," "FinSealed:XX," "FinSealed:YY," "FinSealed:ZZ," "FinRefCopy:PermID07," "FinRefCopyDone:XX," and the other "FinRefCopyDone" messages) may be deleted by initiating cluster XX (and the deletions replicated to the remaining clusters).

A row 1140, keyed by "TempID08," has records indicating a finalize process has been completed for the object associated with "TempID08." Surplus data from the finalization process has been deleted and only the cross-reference to the permanent ID (i.e., "FinDone:PermID09") remains in the finalization record. A new row 1160 keyed by "PermID09" includes the object references from row 1140.

As shown in the implementations above, the systems and methods described herein guarantee complete eventual transition from the temporary ID to the new permanent ID. All references that had ever been recorded under the object's temporary ID can be copied under the object's permanent ID, and no new references can ever be recorded under the object's temporary ID in the future.

CONCLUSION

Systems and/or methods described herein may incorporate an asynchronous distributed object uploading algorithm for replicated use in content addressable storage clusters. The algorithm uses the underlying data replication layer to replicate the index containing the locations of chunks comprising the object. Chunks can be uploaded in different clusters over time until the object is explicitly finalized. After all chunks have been uploaded, the object can be inserted into the content-addressable index system.

The foregoing description of implementations provides illustration and description, but is not intended to be exhaustive or to limit the invention to the precise form disclosed. Modifications and variations are possible in light of the above teachings or may be acquired from practice of the invention.

For example, in another implementation a synchronous version of the finalization algorithm may be used in which different storage clusters communicate directly rather than using the replication layer within a distributed data replication system.

Also, while series of blocks have been described with regard to FIGS. 6-10, the order of the blocks may be modified in other implementations. Further, non-dependent blocks may be performed in parallel.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Further, certain implementations described herein may be implemented as "logic" or a "component" that performs one or more functions. This logic or component may include hardware, such as a processor, microprocessor, an application specific integrated circuit or a field programmable gate array, or a combination of hardware and software (e.g., software executed by a processor).

It should be emphasized that the term "comprises" and/or "comprising" when used in this specification is taken to specify the presence of stated features, integers, steps, or components, but does not preclude the presence or addition of one or more other features, integers, steps, components, or groups thereof.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

What is claimed is:

1. A method comprising:
   receiving, at a device, a plurality of chunks of an object to be uploaded, each chunk, of the plurality of chunks, including a first identifier associated with the object;
   creating, by the device, a first entry, for the object, in a memory associated with the device, the first entry being associated with the first identifier;
   reconstructing, at the device, the object from the plurality of chunks;
   preventing, by the device, content of the object from being modified based on reconstructing the object;
   determining, by the device, a second identifier associated with the object based on the content; and creating, by the device and in the memory, a second entry for the object, the second entry being associated with the second identifier.

2. The method of claim 1, where the device is included in a data replication system, the method further comprising:
replicating a portion of the memory, storing the first entry, to one or more other devices included in the data replication system.

3. The method of claim 1, further comprising:
storing the plurality of chunks in a first portion of the memory that is different than a second portion of the memory; and
storing the first identifier and the second identifier in the second portion of the memory.

4. The method of claim 1, further comprising:
receiving a request from a client, the plurality of chunks being uploaded to the device via the client; and
determining that the plurality of chunks have been uploaded based on receiving the request,
the object being reconstructed based on determining that the plurality of chunks have been uploaded.

5. The method of claim 1, where reconstructing the object includes:
receiving, via a data replication system, information identifying a location in the memory that each chunk, of the plurality of chunks, is stored;
determining, based on the received information identifying the location in the memory that each chunk, of the plurality of chunks, is stored, that each chunk, of the plurality of chunks, has been uploaded; and
reconstructing the object based on determining that each chunk, of the plurality of chunks, has been uploaded.

6. The method of claim 1, where determining the second identifier includes:
computing a hash based on the content; and
determining the second identifier based on the computed hash.

7. The method of claim 1, where creating the second entry includes:
updating an index to allow the object to be accessed by one or more devices of a data replication system based on the first identifier and the second identifier.

8. A non-transitory computer-readable medium storing instructions, the instructions comprising:
one or more instructions which, when executed by at least one processor, cause the at least one processor to:
receive a plurality of chunks of an object to be uploaded, each chunk, of the plurality of chunks, including a first identifier,
create, in a memory, a first entry for the object, the first entry being associated with the first identifier,
reconstruct the object from the plurality of chunks based on the first identifier,
prevent content of the object from being modified based on reconstructing the object,
determine a second, different identifier for the object based on the content, and
create, in the memory, a second entry for the object, the second entry being associated with the second identifier.

9. The non-transitory computer-readable medium of claim 8, where the instructions further comprise:
one or more instructions to replicate the first entry to one or more devices included in a data replication system.

10. The non-transitory computer-readable medium of claim 8, where the instructions further comprise:
one or more instructions to store the plurality of chunks in a first portion of the memory that is different than a second portion of the memory, and
one or more instructions to store the first identifier and the second identifier in the second portion of the memory.

11. The non-transitory computer-readable medium of claim 8, where the instructions further comprise:
one or more instructions to receive a request from a client, the plurality of chunks being uploaded to a device associated with the at least one processor via the client, and
one or more instructions to determine that the plurality of chunks have been uploaded based on receiving the request,
the object being reconstructed based on determining that the plurality of chunks have been uploaded.

12. The non-transitory computer-readable medium of claim 8, where the one or more instructions to reconstruct the object include:
one or more instructions to receive, via a data replication system, information identifying one or more locations in the memory storing the plurality of chunks,
one or more instructions to determine, based on the received information, that the plurality of chunks have been uploaded, and
one or more instructions to reconstruct the object based on the plurality of chunks having been uploaded.

13. The non-transitory computer-readable medium of claim 8, where the one or more instructions to determine the second identifier include:
one or more instructions to determine the second identifier based on a hash of data included in the content.

14. The non-transitory computer-readable medium of claim 8, where the one or more instructions to create the second entry include:
one or more instructions to modify an index, where modifying the index allows the object to be accessed based on the first identifier and the second identifier.

15. A system comprising:
a device to:
receive a plurality of chunks of an object to be uploaded, each chunk, of the plurality of chunks, including a first identifier,
create, in a memory, a first entry for the object, the first entry being associated with the first identifier,
reconstruct the object from the plurality of chunks based on the first identifier,
determine a second, different identifier for the object based on content of the object, and
create, in the memory, a second entry for the object, the second entry being associated with the second identifier.

16. The system of claim 15, where the device is further to:
replicate the first entry to one or more other devices included in a data replication system.

17. The system of claim 15, where the device is further to:
determine that the plurality of chunks have been uploaded based on receiving a request to finalize the object, the object being reconstructed based on determining that the plurality of chunks have been uploaded.

18. The system of claim 15, where, when reconstructing the object, the device is further to:
receive, via an underlying replication layer of a data replication system, information identifying one or more locations in the memory storing the plurality of chunks; and
reconstruct the object based on the information identifying the one or more locations in the memory storing the plurality of chunks.

19. The system of claim 15, where, when determining the second identifier, the device is further to:
compute a hash based on data included in the content, and determine the second identifier based on the computed hash.

20. The system of claim 15, where, when creating the second entry, the device is further to:
modify an index to allow the object to be accessed by a second device, based on the first identifier and the second identifier.

* * * * *